United States Patent

Lockwood et al.

Patent Number: 6,138,097
Date of Patent: Oct. 24, 2000

[54] METHOD OF LEARNING IN A SPEECH RECOGNITION SYSTEM

[75] Inventors: Philip Lockwood, Vaureal; Catherine Glorion, Saint-Cyr-l'Ecole; Laurent Lelievre, Jouars-Pontchartrain, all of France

[73] Assignee: Matra Nortel Communications, France

[21] Appl. No.: 09/161,589

[22] Filed: Sep. 28, 1998

[30] Foreign Application Priority Data

Sep. 29, 1997 [FR] France ................................. 97 12063

[51] Int. Cl.⁷ .................................................. G10L 15/06
[52] U.S. Cl. ............................................................ 704/256
[58] Field of Search .......................... 704/256, 258; 764/255

[56] References Cited

U.S. PATENT DOCUMENTS

| | | | |
|---|---|---|---|
| 5,168,524 | 12/1992 | Kroeker et al. | 381/43 |
| 5,208,897 | 5/1993 | Hutchins | 704/200 |
| 5,222,188 | 6/1993 | Hutchins | 704/200 |
| 5,606,645 | 2/1997 | Matsuura | 704/256 |
| 5,649,056 | 7/1997 | Nitta | 704/256 |
| 5,819,223 | 10/1998 | Takagi | 704/256 |
| 5,913,193 | 6/1999 | Huang et al. | 704/258 |

FOREIGN PATENT DOCUMENTS 0 762 709   3/1997   European Pat. Off. .

OTHER PUBLICATIONS

L R Rabiner, "A Tutorial on Hidden Markov Models and Selected Applications in Speech Recognition", Proceedings of the IEEE, Feb. 1ˢᵗ, 1989, vol. 77, No. 2, pp. 257–285.

G. J. Visotsky, "Voicedialing—The First Speech Recognition Based Service Delivered to Customer's Home from the Telephone Network", Speech Communications, 1995, vol. 17, pp. 235–247.

G. L. Bradshaw, et al., "A Comparison of Learning Techniques in Speech Recognition", International Conference on Acoustics, Speech and Signal Processing—ICASPP, May 1982, vol. 1, Paris, pp. 554–557.

*Primary Examiner*—David R. Hudspeth
*Assistant Examiner*—Susan Wieland
*Attorney, Agent, or Firm*—Kilpatrick Stockton LLP

[57] ABSTRACT

A recognition test matches a speech segment supplied to the system with a set of parameters associated with a reference and memorized in a dictionary. A provisional version of each set of parameters to be memorized in the dictionary in association with a reference is estimated on the basis of one or more segments of speech, after which the provisional version is memorized in the dictionary in association with the reference. At least one repetition of the speech segment is submitted to a recognition test, after which depending on whether it has matched the speech segment with the provisional version, the provisional version is modified and the modified provisional version is memorized.

10 Claims, 2 Drawing Sheets

METHOD OF LEARNING IN A SPEECH RECOGNITION SYSTEM

BACKGROUND OF THE INVENTION

The present invention concerns the field of automatic speech recognition. It concerns more particularly recognition systems calling on a method of learning.

Such a system includes three main functional units: a parametrization unit, a learning unit and a recognition unit.

The parametrization unit calculates relevant parameters on the basis of speech signals picked up by a microphone. These calculations are carried out according to a parametric representation chosen in order to differentiate vocal forms in the best possible way, separating the semantic information contained in the speech from the aesthetic information peculiar to diction. Cepstral representations constitute an important class of such representations(see EP-A-0 621 582).

The recognition unit makes the association between an observed segment of speech, represented by the parameters calculated by the parametrization unit, and a reference for which another set of parameters is stored in a dictionary of references. The sets of parameters stored in the dictionary in association with the different references can define deterministic models (they are for example composed directly of vectors coming from the parametrization unit). But most often, in order to take into account the variability of speech production and of the acoustic environment, sets of parameters which characterise stochastic models are rather used. Hidden Markov models (HMM) constitute an important class of such models. These stochastic models make it possible, by searching out the maximum likelihood, to identify the model which takes into account in the best way the observed sequence of parameters, and to select the reference associated with this model (see L. R. RABINER: "A Tutorial on Hidden Markov Models and Selected Applications in Speech Recognition"; Proceedings of the IEEE, Vol. 77, No. 2, February 1989, pages 257–285).

The learning unit is used to determine the parameters which will be stored in the dictionary and used in the recognition phase. In general, the system asks the user to pronounce several times each word or segment: of speech which is to be associated with a reference. On the basis of these different observations, the learning unit estimates the model parameters which are to be stored in the dictionary. In the case where the dictionary contains stochastic models, this estimation generally amounts to carrying out calculations of the mean and of variance.

The learning process is a very important phase which greatly influences recognition performances. Incorrect or inadequate learning can not be completely compensated. for by the good performances of a recognition algorithm.

A careful user endeavours to carry out the learning in a silent environment, to keep his diction constant: and to avoid extraneous noise (mouth noises, respiration, other external noises . . . ). But many users, who have not been made aware of these problems, run the risk, after learning carried out in poor conditions, of obtaining performances which do not conform to those expected, and of rejecting the system.

To make this learning phase more robust, it is possible to increase the number of pronunciations required to create a reference model. Thus variations in pronunciation can be taken into account since the estimations of the parameters then rest on more complete statistics. The disadvantage of this solution is that it is not ergonomic, the user being required to pronounce each word too many times.

Another solution consists in making more robust the parameters used to represent the vocal forms. This solution does not permit the resolution of such problems as taking into account an intrusive word (spoken by another person or by the user himself) during the learning phase.

The European Patent Application 0 762 709 describes a learning process in which a recognition test is carried out on the first pronunciation of the new word by the user. If another word in the dictionary of references is recognised during this test, the user is warned that the word which he has just pronounced is too similar to another word in the dictionary. If the test does not lead to the recognition of another word in the dictionary, the user is invited to repeat the new word. Processing carried out on the repetitions does not bring about any recognition test. A rejection model ("garbage model") is simply used to "explain" portions of speech which are not part of the new word model previously formed. In other words, the model which is being worked out and the rejection model are used to bring about appropriate fragmentation in order to filter sound which may possibly be emitted by a hesitant or awkward user. With this fragmentation, the model which is in the learning phase is updated then examined to check whether the update has taken place in good conditions. Contrary to the test carried out on the first pronunciation of the word, this verification of the "good" update does not include any recognition test on the basis of the entire dictionary, including the words learned previously.

An object of the present invention is to make possible the realisation of good quality learning on the basis of a relatively low number of pronunciations of the words to be memorised.

SUMMARY OF THE INVENTION

The invention proposes a method of learning, for a system of speech recognition which implements recognition tests, wherein each recognition test matches a segment of speech supplied to the system with at least one set of parameters associated with a reference and memorised in a dictionary of references. The learning method includes, for a set of parameters to be memorised in the dictionary in association with a reference, obtaining several segments of speech successively uttered by a speaker and processing these speech segments in order to estimate said set of parameters. More particularly, it includes the steps of:

/a/ estimating a provisional version of said set of parameters on the basis of at least one of the segments of speech;

/b/ memorising said provisional version in the dictionary in association with the reference; and /c/ submitting at least one of the speech segments to a recognition test, and modifying the provisional version memorised in a manner depending on whether said recognition test matches said speech segment with said provisional version or not.

The use of recognition tests during the learning phase makes it possible to discriminate distinctly-spoken utterances and those affected by extraneous noise. The latter can be eliminated in order to calculate the parameters to be stored in the dictionary without the user necessarily having to entirely resume the learning phase for the word or speech segment in question. The number of required pronunciations can thus remain limited, the existing structure of the dictionary being taken into account to accept a certain variability in diction on the part of the user.

In an advantageous embodiment, the estimation of step /a/ is carried out on the basis of a number n, at least equal to one, of segments of speech first pronounced by the speaker, and the speaker is requested to pronounce at least one supplementary segment of speech. Step /c/ is carried out for each supplementary segment thus required, in order to update the provisional version memorised in the dictionary, provided that the recognition test matches said supplementary segment with the provisional version of the set of parameters. Updating the memorised provisional version is thus carried out as the supplementary speech segments are pronounced by the speaker.

In another embodiment, the estimation of step /a/ is carried out on the basis of a number m, equal to at least two, of speech segments initially pronounced by the speaker, and step /c/ is carried out for at least certain of said m speech segments, in order in particular to eliminate segments affected by extraneous noise.

DESCRIPTION OF PREFERRED EMBODIMENTS

Figure 1:
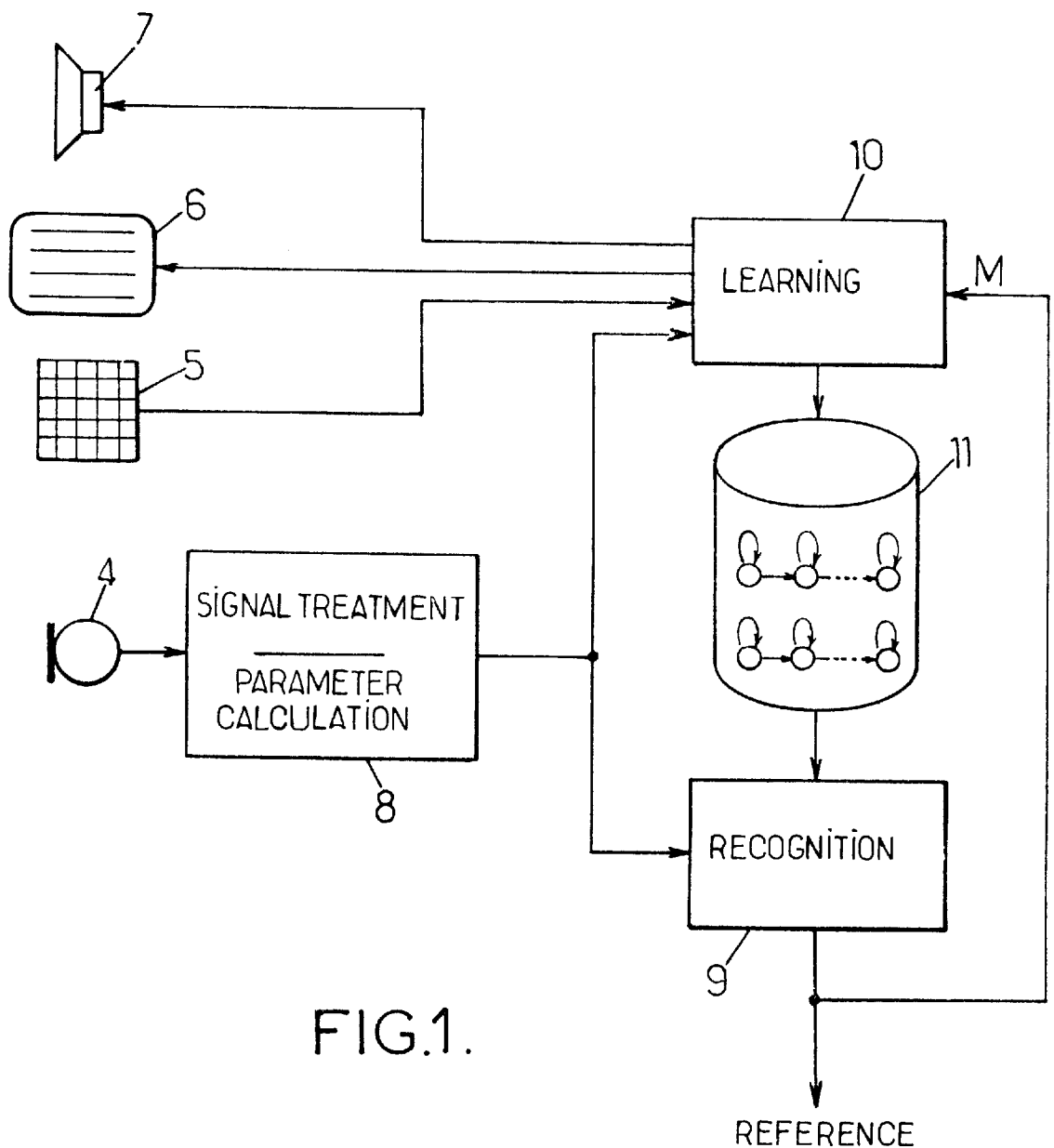
FIG. 1 is a block diagram of a recognition system implementing the present invention.

The system of speech recognition represented on FIG. 1 has a user interface consisting of a microphone 4, a keyboard 5, a display screen 6 and a loudspeaker 7.

The acoustic signals delivered by the microphone 4 are supplied to a unit 8 for signal processing which provides the relevant parameters to the recognition unit 9 and the learning unit 10.

The keyboard 5, the screen 6 and the loudspeaker 7 serve particularly in the dialogue between the user and the learning unit 10.

The recognition system comprises in addition a memory 11 which constitutes a dictionary of references. In this dictionary, the learning unit 10 records models in association with references. In the recognition phase, unit 9 analyses the parameters provided by unit 8 and matches a model with them, i.e. a set of parameters memorised in the dictionary 11, and delivers the associated reference as the output of the recognition system. This reference can then be used by the equipment of which the recognition system forms a part.

By way of illustrative example, this equipment can be a telephone terminal of the hands-free type in which the recognition system is used to control functions such as automatic dialling, in response to the names of callees and/or to control words spoken by the user. The microphone 4, the keyboard 5, the screen 6, and the loudspeaker 7 can be those which the telephone terminal comprises anyhow.

Various types of parameters representing the vocal structures, calculated by unit 8, can be used within the framework of the present invention. By way of example, they can be cepstral coefficients in root. For detailed explanations of this type of representation, reference is made to the European Patent Application 0 621 582. The signal processing unit 8 can thus carry out the following operations:

digitization of the signal provided by the microphone 4;

division of the digital signal into successive frames, lasting 16 ms for example;

detection of vocal activity in order to distinguish the speech frames from the signal frames which only consist of noise;

Fourier transform of each speech frame in order to obtain a spectrum $X(\omega)$, which may subjected to noise removal by spectral subtraction of estimates of noise (see EP-A-0 534 837);

application of a root compression function (or of a power function) in order to calculate the $|X(\omega)|^\gamma$, where $\gamma$ represents a fixed or adaptive exponent, in the range from 0 to 2 (it is also possible to use a logarithmic compression function);

inverse Fourier transformation of the quantities $|X(\omega)|^\gamma$ to obtain so-called "cepstral" coefficients, forming a vector of p coefficients (for example $p \approx 20$). This cepstral vector is provided by unit 8 with respect to the frame in question.

Each sequence of consecutive frames detected as supporting a vocal activity normally corresponds to a speech segment uttered by a speaker. For each of these segments, unit 8 delivers a sequence of cepstral vectors which can be processed by units 9 and 10.

In the embodiment described here, each reference in the dictionary 11 is associated with a hidden Markov model characterised by a number of states and, for each state, by a law of density of probability of observation of the cepstral vectors. These laws are for example Gaussian laws of dimension p. They are thus defined each by a mean (vector) and by a variance (matrix).

A recognition test carried out by unit 9, on the basis of a sequence of cepstral vectors obtained from a segment of speech processed by unit 8, consists in identifying which of the models of the reference dictionary 11 maximises the likelihood of the observation of said sequence of cepstral vectors. A standard means of carrying out this identification is to use the Viterbi algorithm. For different models of the dictionary, a Viterbi trellis makes it possible to determine the sequence of state which maximises the probability of observation of the sequence of cepstral vectors. The optimum model, for which the maximised probability is the greatest, is finally retained, and the associated reference is delivered by the recognition unit 9.

Certain of the models contained in the dictionary 11 are rejection models artificially constructed to be preferentially retained by unit 9 when the speech segment submitted to the recognition test does not correspond to any of the words referenced in the dictionary.

The learning phase consists in calculating the parameters of the probability laws associated with the hidden Markov models. For each reference to be memorised, the user is invited to pronounce the associated word several times in order to provide unit 10 with adequate statistics to enable it to evaluate in a reliable manner the parameters of the probability laws in relation to the different states of the model.

The methods used to proceed to these estimates are standard. In this regard, reference may be had to the article by L. R. RABINER quoted previously.

Amongst the different pronunciations of the word, certain of them may be disrupted by extraneous noise. These should be ignored in estimating the parameters of the model, otherwise these estimates would not be reliable. The necessity of a large number of repetitions of the word is to be avoided to the extent where it would tend to make using the system very tedious.

To filter in this way these repetitions affected by extraneous noise, the invention uses recognition tests similar to those carried out in the recognition phase.

Figure 2:
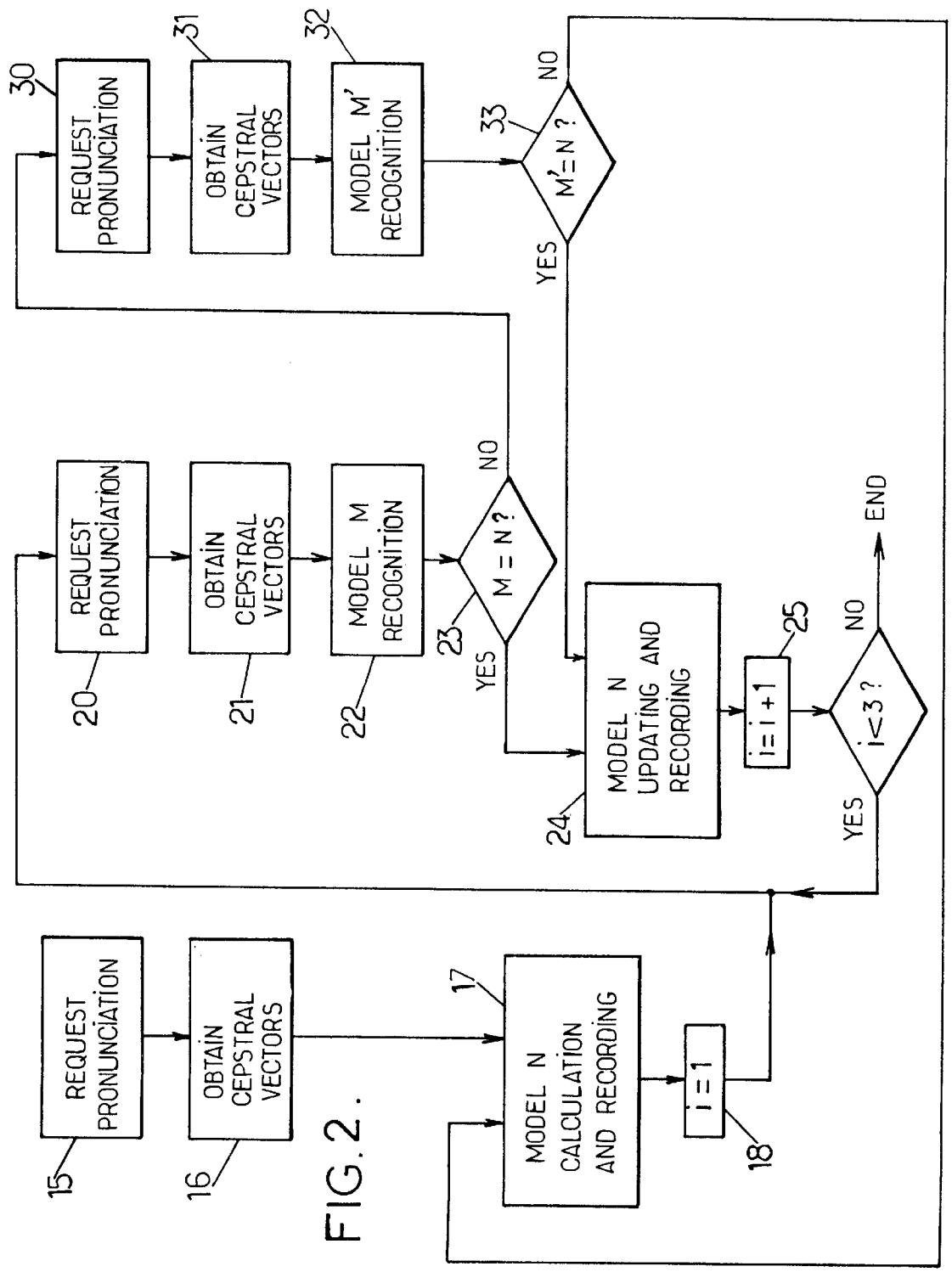
FIG. 2 is a flowchart of a procedure which can be implemented by the learning unit of the system in FIG. 1.

By way of example, the learning related to a new reference can be carried out in three passes, according to the procedure represented in FIG. 2.

In this example, the dictionary of references 11 is considered to contain already N−1 word models associated with references, as well as one or more rejection models. Once the user has initiated, with the aid of the keyboard 5, a procedure for creating a new model, unit 10 invites him, by means of a message displayed on the screen 6 and/or by a sound signal produced by the loudspeaker 7, to pronounce the word in question a first time (stage 15).

Once the user has pronounced the word, the signal processing unit 8 supplies to unit 10 the sequence of corresponding cepstral vectors (stage 16). At this moment, unit 10 calculates the characteristic parameters of the new model N by means of any appropriate method (for example, the one described in the previously quoted article by L. R. RABINER), and records this set of parameters in the dictionary 11 in relation to the corresponding reference (stage 17). This reference can simply comprise the write address of the set of parameters in the memory 11. The set of parameters registered in stage 17 is a provisional version which will have to be updated with the aid of two other pronunciations of the word not affected by extraneous noise. Stage 18, represented on FIG. 2, consists in initialising to 1 the variable i which represents the number of pronunciations of the word on the basis of which the provisional version of the set of parameters, stored in the dictionary 11, has been estimated.

Unit 10 then controls the display of a new message on the screen 6 and the emission of a new sound signal by the loudspeaker 7 to ask the user to repeat the word (stage 20). After this new pronunciation and the corresponding cepstral vectors have been obtained (stage 21), a recognition test is carried by unit 9 on the basis of this sequence of cepstral vectors (stage 22).

The reference of the model M recognised by unit 9 is supplied to the learning unit 10 which then examines, in stage 23, whether the recognised model is the same as that for which the process of creating the set of parameters is in progress. It is only if this model N which is in the process of being constructed, is well recognised that the learning unit 10 proceeds to update the provisional version of the parameters of the model N and to record the new version in the dictionary 11.

This updating (stage 24) consists in refining the estimates of the means, and possibly of the variances, of the probability densities of the states of the model, by taking into account the new observations of the cepstral vectors in addition to those which contributed to the calculation of the provisional version of the model. After this update, the variable i is increased by one unit (stage 25) and, if i<3, unit 10 returns to stage 20 to obtain the next pronunciation of the word and process it in the same manner.

When i=3, the creation of the model N is terminated, and the provisional version of the recorded set of parameters becomes definitive. Unit 10 can warn the user that the learning of the word has been terminated, for example by making the loudspeaker 7 emit a sound signal followed by a restitution of the last repetition of the word.

When, for one of the repetitions of the word, the model N in the process of being created is not recognised by unit 9, the learning unit 10 requests a further repetition of the word (stage 30). After obtaining corresponding cepstral vectors (stage 31) and the reference of the model M' recognised by unit 9 (stage 32), unit 10 examines whether this model M' is the same as the one in the process of being created (stage 33). In the affirmative, it is likely that the penultimate pronunciation of the word has been disrupted by extraneous noise, the last and the antepenultimate pronunciations being consistent with one another. In this case, unit 10 returns to the process preceding stage 24 by updating the parameters of the model in the process of being created.

However, if the models M,M' recognised for two consecutive repetitions of the word by the user both differ from the one N in the process of being created, it is considered that the provisional version of the set of parameters of the model is probably not very reliable, so that this provisional version is deleted. In its place, unit 10 calculates a new set of parameters on the basis of the last repetition of the word, i.e. with the cepstral vectors obtained in stage 31. Two supplementary repetitions (or more if new inconsistencies appear) will be requested from the user. On the flowchart of FIG. 2, this corresponds to the fact that the learning unit 10 returns to stage 17.

The recognition tests carried out in the learning phase make it possible to filter pronunciations affected by extraneous noise without forcing the user to necessarily recommence all the three pronunciations required. The system thus remains quite ergonomic in the learning phase.

The use of recognition tests makes it possible to tolerate a certain variability in diction in the learning phase, which further improves the ergonomics. In addition, this makes possible a better construction of the Markov models, thanks to the enlarging of the observation statistics of the cepstral vectors. A different solution would consist in deciding to accept, or not accept, a repetition of the word on the sole basis of a likelihood criterion: the cepstral vectors obtained for the repetition would be presented to a Viterbi trellis corresponding to the sole provisional version of the model, and the likelihood of the best path in the trellis would be compared with a threshold in order to decide to accept, or not accept, the repetition. The disadvantage of this other solution is the difficulty of defining an adequate threshold. A criterion of this kind does not differentiate between normal variability of diction and undesirable extraneous noise, such that too severe a criterion leads to frequent rejections and spoils the ergonomics, whilst too tolerant a criterion affects the quality of the learning. In this respect, the present invention provides a good compromise because it takes into account in the recognition test words already learned.

It will be noted that the example of FIG. 2 only illustrates one possible strategy for using recognition tests in the learning phase in accordance with the invention. Numerous other scenarios could be taken into consideration by the learning unit 10, such as, for example:

when, at the same time, the second and the third pronunciations of a word lead to a different model being recognised from that created during the first pronunciation of this word, it would be possible to create another model on the basis of the cepstral vectors obtained from one of these repetitions, and to examine whether this other model is recognised or not by subjecting the other of these two repetitions to a recognition test. It is then necessary to keep in the memory a supplementary sequence of cepstral vectors; but this could mean that the user would have one repetition less to carry out;

the number of pronunciations required to create and validate a model could be other than three, and the number of consecutive failures of recognition to be noted for abandoning the provisional version of the parameters could be greater than two. Moreover, the number n of pronunciations required before the first calculation of the provisional model could be greater than one;

if the recognition tests carried out by unit 9 supply not only the best model, in the sense of the maximum likelihood, but also a list of Q best models (Q≧2), the model N in the process of being created could be considered as recognised, in stages 22 and 32, if it is included in this list without necessarily appearing at its head.

Another interesting possibility provided by the invention is that the learning unit 10 examines whether a same model word stored in the dictionary 11, but different from the model N in the process of being created, is recognised several times by unit 9 whilst the same new word is being learned. In this case, unit 10 can address a message to the user indicating a risk of confusion, the word being currently learned being close to a word learned previously. The user can then stop the learning in progress and begin it again substituting another word, in order to prevent frequent errors of interpretation of the word occurring later. This message is delivered to the speaker when at least two recognition tests carried out in the learning stage on different segments of speech, corresponding to two pronunciations of the same word, match these two segments with the same model in the dictionary which is not the model in the process of being created. Provision is advantageously made for a recognition to be carried out likewise on the basis of the segment corresponding to the first pronunciation of the word (or to n first pronunciations), i.e. after stage 16 on FIG. 2. In this case, if the model thus recognised is a word model (and not a rejection model) and if this same model is again recognised for a later repetition (stage 22 or 32), then the message will warn the user of the risk of confusion.

In another embodiment, the user is first of all invited to pronounce a certain number of times the word to be memorised. This number m is, for example, 3 or 4. The parameters of the provisional model are first of all calculated on the basis of m sequences of cepstral parameters obtained for the m pronunciations. Then, each of these sequences is submitted in turn to the recognition test. For each of these m tests, if the model in the process of being created is recognised, the estimation of the parameters of the model can possibly be modified, for example by refining the fragmentation of the cepstral vectors of the sequence between the states of the Markov model. If, on the other hand, the model in the process of being created is not recognised, the estimation of the parameters of the model is modified, for example by eliminating from the observation statistics the data relating to the sequence submitted to the recognition test and by recalculating the means and/or the variances of the probability laws relating to the states of the model. If too large a number of the m tests leads to non-recognition of the provisional model, the user can be invited to repeat the word m times.

What is claimed is:

1. In a speech recognition system comprising a dictionary for storing parameter sets associated with respective references and means for carrying out recognition tests, wherein each recognition test matches a speech segment supplied to the system with at least one parameter set from said dictionary, a learning method for generating an entry in said dictionary in association with a reference, which comprises obtaining a plurality of speech segments each pronounced by a speaker to correspond to said reference, and processing said plurality of speech segments, said processing comprising the steps of:

/a/ estimating a provisional version of a parameter set on the basis of at least one of said plurality of speech segments;

/b/ storing said provisional version in the dictionary in association with said reference;

/c/ submitting at least one of said plurality of speech segments to a recognition test; and /d/ modifying the provisional version stored in a manner depending on whether said recognition test matches said speech segment with said provisional version or not.

2. A method according to claim 1, comprising the steps of:

obtaining m speech segments each pronounced by the speaker to correspond to said reference, wherein m is an integer at least equal to 2;

estimating said provisional version of the parameter set on the basis of said m speech segments;

carrying out steps /c/ and /d/ for at least one of said m speech segments.

3. A method according to claim 1, wherein the parameter sets stored in said dictionary define hidden Markov models.

4. A method according to claim 1, wherein after said parameter set has been estimated from the plurality of speech segments pronounced by the speaker, a sound restitution of one of said plurality of speech segments is performed.

5. A method according to claim 1, comprising the steps of:

obtaining n speech segments each pronounced by the speaker to correspond to said reference, wherein n is an integer at least equal to 1;

estimating said provisional version of the parameter set on the basis of said n speech segments;

prompting the speaker to pronounce a supplementary speech segment corresponding to said reference;

submitting said supplementary speech segment to a recognition test;

updating the provisional version stored in the dictionary if the recognition test matches said supplementary segment with the provisional version of the parameter set.

6. A method according to claim 5, further comprising repeating at least once the sequence of said steps of prompting, submitting and updating.

7. A method according to claim 5, further comprising the step of submitting each of said n speech segments to a recognition test.

8. A method according to claim 6, further comprising the step of delivering a message to the speaker to indicate a risk of confusion, when at least two recognition tests to which different speech segments are submitted match said different speech segments with a same parameter set from the dictionary other than said provisional version.

9. A method according to claim 6, wherein the provisional version of the parameter set is definitively recorded in the dictionary, in association with said reference, after it has been updated a determined number of times.

10. A method according to claim 6, further comprising the step of replacing the provisional version stored in the dictionary by a new provisional version of the parameter set, estimated on the basis of at least one of two consecutive speech segments, when both recognition tests to which said consecutive speech segments are submitted fail to match said consecutive speech segments with the provisional version of the parameter set.

\* \* \* \* \*